United States Patent
Isaac et al.

(10) Patent No.: US 9,370,141 B2
(45) Date of Patent: Jun. 21, 2016

(54) SPREADER SYSTEM FOR AN AGRICULTURAL HARVESTER

(71) Applicant: CNH America LLC, New Holland, PA (US)

(72) Inventors: Nathan Edward Isaac, Lancaster, PA (US); Mark David Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 218 days.

(21) Appl. No.: 13/711,437

(22) Filed: Dec. 11, 2012

(65) Prior Publication Data

US 2014/0162739 A1 Jun. 12, 2014

(51) Int. Cl.
*A01F 12/30* (2006.01)
*A01D 41/12* (2006.01)

(52) U.S. Cl.
CPC ............ *A01F 12/30* (2013.01); *A01D 41/1243* (2013.01)

(58) Field of Classification Search
CPC .................................................. A01D 41/1243
USPC ........................ 460/111, 112; 56/320.1, 320.2
See application file for complete search history.

(56) References Cited

U.S. PATENT DOCUMENTS

| | | | |
|---|---|---|---|
| 3,654,750 A * | 4/1972 | Van Der Lely | 56/16.2 |
| 4,617,942 A | 10/1986 | Garner | |
| 5,797,793 A | 8/1998 | Matousek et al. | |
| 6,238,286 B1 | 5/2001 | Aubry et al. | |
| 6,343,986 B1 | 2/2002 | Hofer | |
| 6,500,064 B1 | 12/2002 | Schrattenecker | |
| 6,598,812 B1 * | 7/2003 | Matousek et al. | 239/682 |
| 6,602,131 B2 | 8/2003 | Wolters | |
| 6,656,038 B1 | 12/2003 | Persson | |
| 6,688,972 B2 | 2/2004 | Buermann et al. | |
| 6,736,721 B2 * | 5/2004 | Niermann et al. | 460/112 |
| 6,866,580 B2 * | 3/2005 | Weichholdt et al. | 460/112 |
| 7,094,146 B2 | 8/2006 | Holmen | |
| 7,553,227 B2 | 6/2009 | Landuyt | |
| 7,896,732 B2 | 3/2011 | Benes et al. | |
| 7,927,200 B2 | 4/2011 | Van Overschelde et al. | |
| 8,029,347 B2 | 10/2011 | Pohlmann et al. | |
| 8,070,570 B2 | 12/2011 | Murray et al. | |
| 8,128,467 B2 | 3/2012 | Weichholdt et al. | |
| 8,210,915 B2 * | 7/2012 | Holmen | 460/112 |
| 2005/0124399 A1 * | 6/2005 | Holmen | 460/111 |

OTHER PUBLICATIONS

Axial Flow Combines Class V-IX, Axial Flow Combine Brochure, 2009, p. 24, Case IH.

* cited by examiner

*Primary Examiner* — Thomas B Will
*Assistant Examiner* — Mai Nguyen
(74) *Attorney, Agent, or Firm* — Patrick M. Sheldrake

(57) ABSTRACT

A spreader system for an agricultural harvester, including a hood assembly comprising a rotatable first hood and second hood, and wherein the first and second hoods cover a portion of a respective first and second discs and are configured to rotate between a first position and a second position, in the first position the first and second hoods block upward and rearward flow of a first agricultural material, a second agricultural material, an airflow, or a combination thereof, in the second position the first and second hoods are configured to facilitate upward and rearward flow of the first agricultural material, the second agricultural material, the airflow, or the combination thereof.

20 Claims, 4 Drawing Sheets

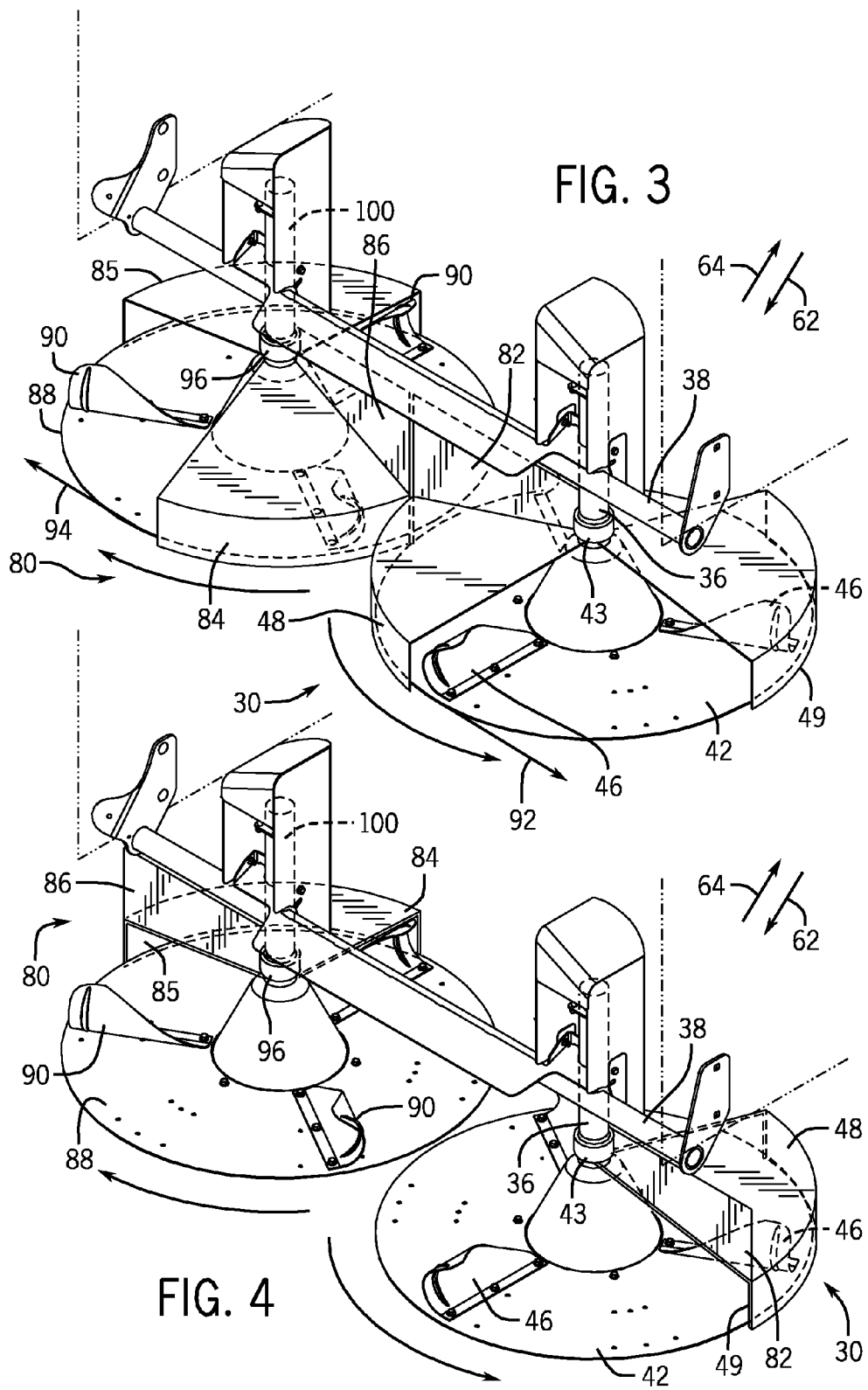

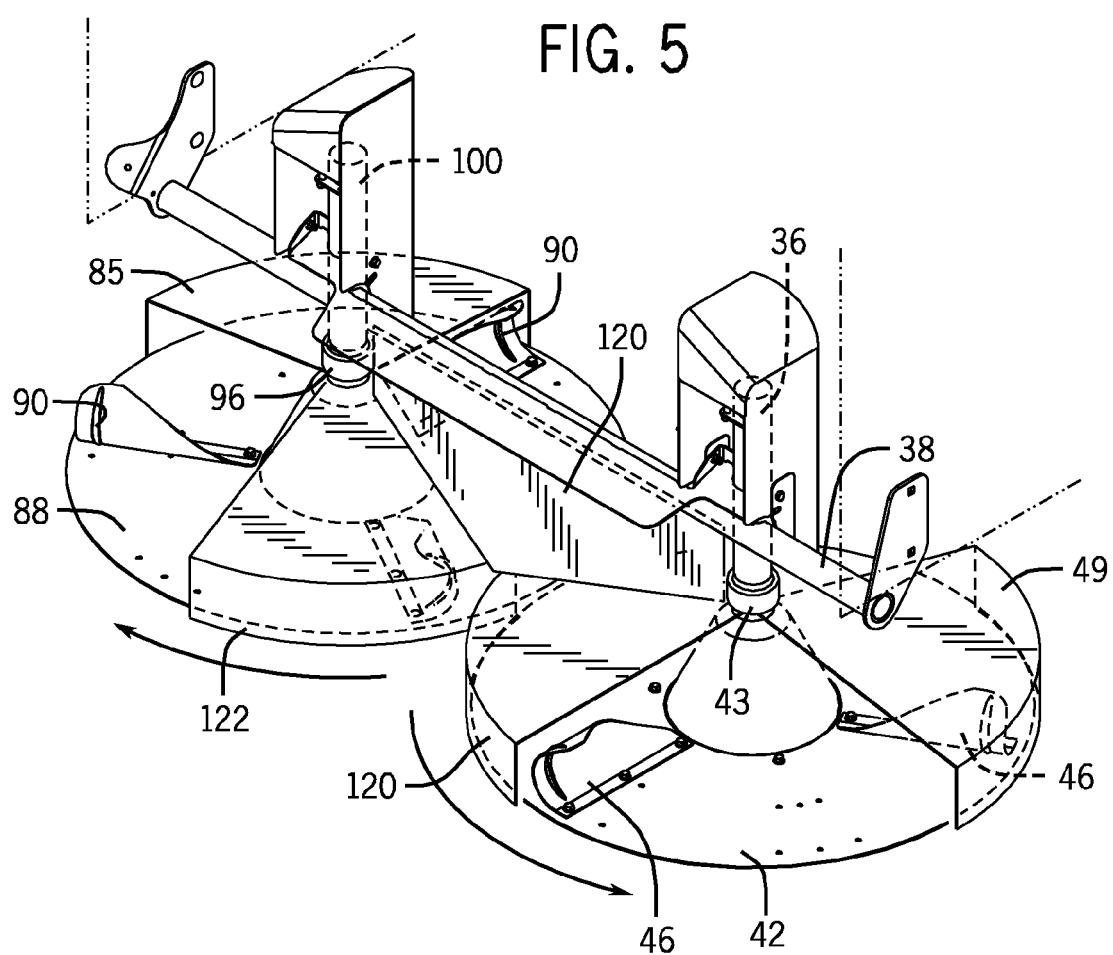

SPREADER SYSTEM FOR AN AGRICULTURAL HARVESTER

BACKGROUND

The invention relates generally to agricultural equipment, such as harvesters, and more specifically, to a system for spreading agricultural material from a harvester.

A harvester may be used to harvest agricultural crops, such as barley, beans, corn, cotton, flax, oats, rye, soybeans, wheat, or other plant crops. Moreover, a combine (e.g., combine harvester) is a specific type of harvester generally used to harvest grains (e.g., barley, corn, flax, oats, rye, soybeans, wheat, etc.). Accordingly, a combine may be used to separate a plant into different agricultural materials, such as grain, chaff, and straw. The combine begins the harvesting process by cutting the plant stalk, usually using a cutting device (i.e., a header). The combine then moves the plant from the cutting device into the combine with a feeder system. Inside the combine, the plant undergoes processes that separate it into agricultural materials. Some of these agricultural materials (e.g., straw, chaff) may be discharged from the combine onto the recently harvested field. The combine may spread the agricultural material throughout the field for decomposition, and/or may create narrow rows of agricultural material (i.e., create a windrow) for collection by another machine (e.g., a baler). Unfortunately, current combines may not effectively spread and/or windrow agricultural materials.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a spreader system for an agricultural harvester, including a first spreader disc having at least one paddle, wherein the first spreader disc is configured to receive a first agricultural material, a second agricultural material, or a combination thereof, and to distribute the first agricultural material, the second agricultural material, or the combination thereof, throughout a field, a second spreader disc having at least one paddle, wherein the second spreader disc is configured to receive the first agricultural material, the second agricultural material, or the combination thereof, and to distribute the first agricultural material, the second agricultural material, or the combination thereof, through the field, a first hood surrounding a portion of the first spreader disc, wherein the first hood is configured to rotate between a first position and a second position, the first hood is configured to block upward and rearward flow of the first agricultural material, the second agricultural material, an airflow, or a combination thereof, while the first hood is in the first position, and the first hood is configured to facilitate upward and rearward flow of the first agricultural material, the second agricultural material, the airflow, or the combination thereof, while the first hood is in the second position, and a second hood surrounding a portion of the second spreader disc, wherein the second hood is configured to rotate between a first position and a second position, the second hood is configured to block upward and rearward flow of the first agricultural material, the second agricultural material, the airflow, or the combination thereof, while the second hood is in the first position, and the second hood is configured to facilitate upward and rearward flow of the first agricultural material, the second agricultural material, the airflow, or the combination thereof, while the second hood is in the second position.

In a second embodiment, a spreader system for an agricultural harvester including, a hood assembly including, a rotatable first and second hoods, and wherein the first and second hoods cover a portion of a respective first and second discs and are configured to rotate between a first position and a second position, in the first position the first and second hoods block upward and rearward flow of a first agricultural material, a second agricultural material, an airflow, or a combination thereof, in the second position the first and second hoods are configured to facilitate upward and rearward flow of the first agricultural material, the second agricultural material, the airflow, or the combination thereof.

In a third embodiment, a method for operating a spreader assembly of an agricultural implement, including rotating first and second hoods into a first position that blocks upward and rearward airflow, spinning a first and second spreader disc with paddles, flowing a first agricultural material into the first and second hoods and spreading the first agricultural material and flowing a second agricultural material over the first and second hoods into a row behind the agricultural implement.

DRAWINGS

These and other features, aspects, and advantages of the present invention will become better understood when the following detailed description is read with reference to the accompanying drawings in which like characters represent like parts throughout the drawings, wherein:

FIG. 3 is a perspective view of the spreader system of FIG. 2, with the hoods in a first or windrow position;

FIG. 4 is a perspective view of the spreader system of FIG. 2, with the hoods in a second or spreader position; and FIG. 5 is a perspective view of another embodiment of a spreader system having a curtain between the spreader discs.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
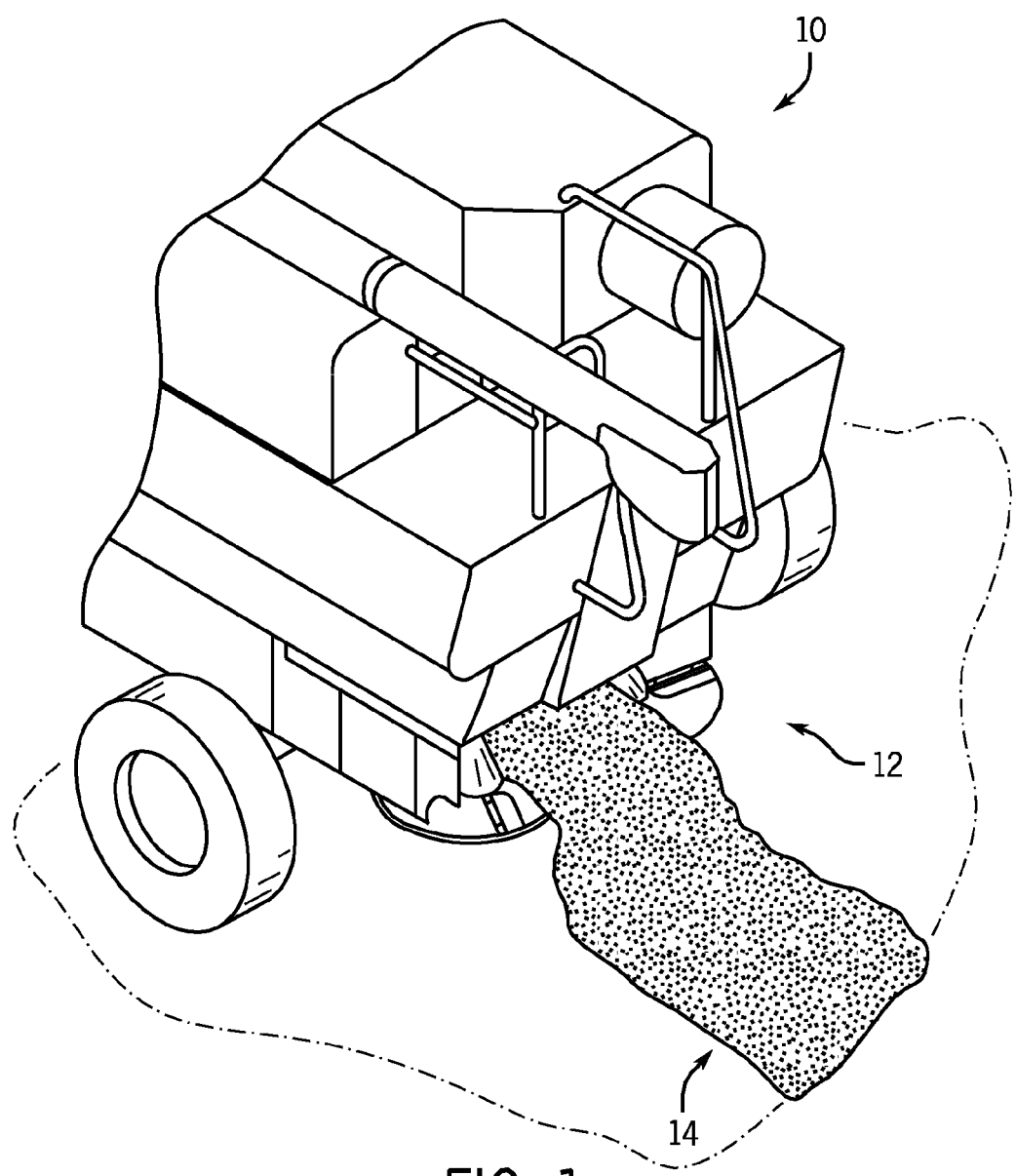
FIG. 1 is a rear perspective view of an embodiment of a harvester with a spreader system.

Turning now to the drawings, FIG. 1 is a rear perspective view of an embodiment of a harvester 10 with a spreader system 12. The harvester 10 may harvest grains such as barley, corn, flax, oats, rye, soybeans, wheat, and so forth. Accordingly, the harvester 10 is configured to remove the desired portion of the plant and to separate the portion into different agricultural materials (e.g., grain, straw, and chaff). As discussed above, the harvester discharges this material after processing it. Some of the agricultural materials may exit the rear of the harvester into the spreader system 12. For example, the spreader system 12 may direct chaff into spreader discs, to distribute the chaff throughout the field while creating narrow rows of straw 14 behind the harvester 10 (i.e., windrows). Alternatively, the spreader system 12 may direct straw and chaff into the spreader discs to distribute the straw and chaff evenly over a field.

The harvesting process begins with the harvester 10 using a cutting assembly to cut plant stalks. An operator of the harvester 10 may be seated in a cab, and may monitor the operation of the cutting assembly and other systems of the harvester 10. After removing the plants, the harvester 10 moves the plants from the cutting assembly into the harvester 10 for processing. Once inside the harvester 10, the plants may undergo various processes that separate the plant into different agricultural materials (e.g., grain, chaff, straw), generally into two streams of material. The first stream of agricultural material (straw and chaff) may then exit the harvester 10 into the spreader system 12. The second stream of grain and chaff is winnowed by a fan that separates the chaff from the grain. The grain then falls into a cross auger and is elevated to a storage tank to be off-loaded when the operator may choose, via an unloading system. The winnowed chaff is blown to the spreader system 12 as a second stream to be spread onto a field.

Figure 2:
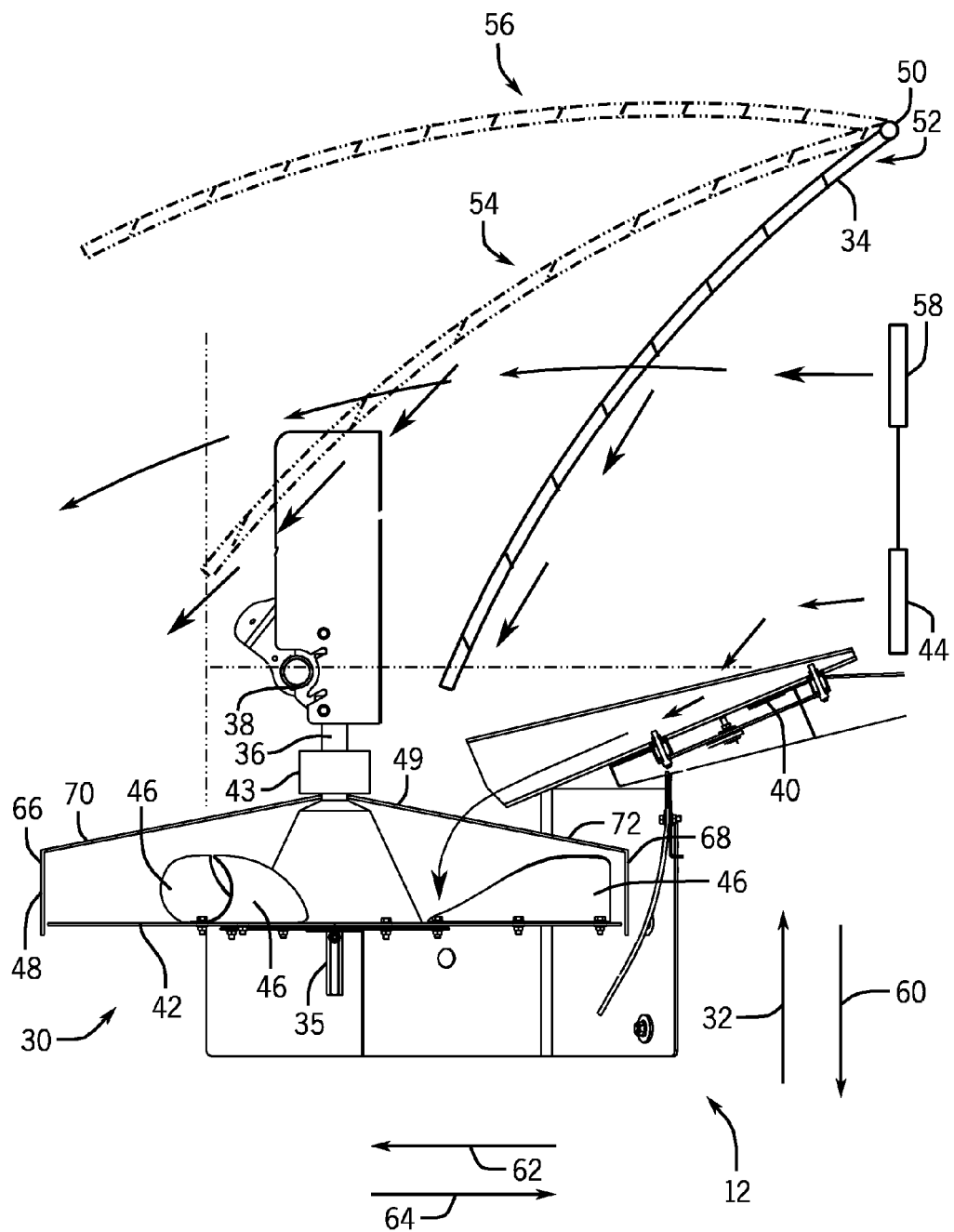
FIG. 2 is a side view of an embodiment of a spreader system that may be used within the harvester of FIG. 1.

FIG. 2 is a side view of an embodiment of a spreader system with a hood assembly 30. The hood assembly 30 enables the spreader system 12 to effectively spread a first agricultural material (e.g., chaff) and windrow a second agricultural material (e.g., straw) by controlling an upward and rearward airflow (e.g., in direction 32 and 62). The spreader system 12 includes the hood assembly 30, a door 34, a first shaft 35, a first hub 36, a frame 38, a chute 40, a spreader disc 42, and an actuator 43. As explained above, the harvester 10 separates plants into different agricultural materials (e.g., grain, straw, and chaff). These materials are moved through the harvester 10 in along different paths and eventually exit the harvester to decompose or to undergo additional processes. Depending on the needs of the user, it may be desirable to keep the winnowed chaff and straw separate (e.g., to bale the straw for later use). Accordingly, the chaff may be spread onto the field, while the straw is deposited in narrow rows (i.e., windrows) behind the harvester for later collection by another machine (e.g., a baler). In other circumstances, both the chaff and the straw may be spread onto the field for decomposition.

In operation, chaff may exit the harvester 10 through an opening 44. After passing through the opening 44, the chaff slides down the chute 40 and into the spreader disc 42. The spreader disc 42 includes one or more paddles 46 configured to distribute the agricultural material that flows into the spreader disc 42. The spreader disc 42 is coupled to the shaft 35. The shaft 35, in turn, is rotated within hub 36 by a drive system (e.g., hydraulic or mechanical), which then rotates the spreader disc 42 and paddles 46. As the chaff flows into the spinning spreader disc 42, the paddles 46 contact the chaff and move the chaff in a circular motion until the chaff exits the spreader disc 42 in a tangential direction. In operation, the spreader discs may rotate at high speed (e.g., 100-1200 RPM). The speed of rotation and the contact between the paddles and the air may induce significant air movement around the spreader discs, including airflow in an upward direction 32. The upward airflow may disrupt straw, or another agricultural material, flow over the spreader disc, thereby interfering with the windrowing process. The hood assembly 30 blocks upward airflow from the spreader disc 42 and paddles 46, thereby facilitating flow of straw over the spreader disc 42. In addition, the hood assembly 30 blocks agricultural material from exiting the spreader disc 42 at certain angles. The hood assembly 30 includes a first hood 48 and may include a second hood 49. The first and second hoods 48 and 49 include respective vertical walls 66 and 68, and upper sloped surfaces 70 and 72. The first hood 48 facilitates windrowing the second agricultural material by covering a portion of the spreader disc 42, thus blocking upward airflow with the upper sloped surface 70, while blocking rearward agricultural material flow with vertical wall 66, which interferes with windrowing of the second agricultural material (e.g., straw). Moreover, the first hood 48 may direct the first agricultural material (e.g., chaff) laterally outward from the row of straw (i.e., windrow), so that the first agricultural material does not interfere with the second agricultural material. The second hood 49 may block agricultural material from exiting the spreader disc 42 in direction 64 with the vertical wall 68.

As explained above, it may be desirable to spread the first agricultural material (e.g., chaff) and the second agricultural material (e.g., straw). As illustrated, the spreader system 12 includes the door 34. The door 34 is rotatable about a hinge 50 into three different positions, a first position 52, a second position 54, and a third position 56. The first position 52 is a closed position. In the first or closed position 52, the door 34 directs the second agricultural material (e.g., straw) from the opening 58 downward in direction 60. More specifically, the door 34 in the closed position 52 directs the straw into the spreader disc 42 for spreading. As explained above, once agricultural material engages the spreader disc 42, the spinning paddles 46 induce the material to exit the spreader disc 42 in a tangential direction.

In the second position 54, the door 34 is in an open position and directs the second agricultural material onto the first hood 48 (i.e., the upper sloped surface 70). In the second position 54, the first agricultural material (e.g., chaff) is spread throughout the field, and the second agricultural material (e.g., straw) is windrowed. As illustrated, the door 34 enables the second agricultural material from the opening 58 to flow over the spreader disc 42 in the direction 62. Indeed, the second agricultural material exits the opening 58 in the direction 62, contacts the door 34, and then flows downward in the direction 60 and into contact with the first hood 48 (i.e., the upper sloped surface 70). As the second agricultural material contacts the first hood 48, it slides off the upper sloped surface 70 in the direction 62 and falls onto the field below. As explained above, the first hood 48 blocks upward movement of the airflow from the paddles 46, thereby enabling the second agricultural material to flow smoothly over the spreader disc. Moreover, by redirecting the second agricultural material onto the first hood 48, the first hood 48 is able to absorb energy from the second agricultural material, reducing the force at which the second agricultural materials contacts the field (i.e., enable the second agricultural material to rest on the plant stubble).

As explained above, the door 34 may rotate into a third position 56. The third position 56, like the second position 54, places the door 34 in an open position. In the third position 56, the first agricultural material (e.g., chaff) is spread throughout the field and the second agricultural material (e.g., straw) is windrowed. As illustrated, the door 34 enables the second agricultural material to travel far enough from the opening 58, in direction 62, to avoid falling into the spreader disc 42 or on top of the first hood 48. Thus allowing the second agricultural material (e.g., straw) to exit the rear of the harvester 10 into a windrow while the spreader disc 42 spreads the first agricultural material (e.g., chaff).

FIG. 3 is a perspective view of the spreader system of FIG. 2 with the first hood assembly 30 and the second hood assembly 80 in a first or windrow position. In the first position, the first hood assembly 30 and the second hood assembly 80 direct the first agricultural material to spread laterally outward from the harvester 10, instead of directly behind the harvester 10. In addition, the second agricultural material flows over the hood assemblies 30 and 80 into a windrow behind the harvester 10, instead of mixing with the first agricultural material in the spreader. The first hood assembly 30 includes the first hood 48, second hood 49, and a wall 82. The second hood assembly 80 includes a first hood 84, second hood 85, and a wall 86. The walls 82 and 86 may be integral to or separate from the hoods 48 and 84. In operation, the walls 82 and 86 block the first agricultural material from flowing over the top of the hoods 48 and 84, thus directing the first agricultural material into the rotating spreader discs 42 and 88.

As illustrated, the spreader disc 42 rotates counterclockwise, while the spreader disc 88 rotates clockwise. The rotational direction of the spreader discs 42 and 88 in combination with the hood assemblies 30 and 80 enable the spreader system 12 to spread the first agricultural material away from a windrow (i.e., laterally outward from the windrow). As the spreader discs 42 and 88 rotate, the paddles 46 and 90 direct the first agricultural material under the hoods 48 and 84 before expelling the first agricultural material in the tangential directions of arrows 92 and 94. The hoods 48, 49, 84, and 85 cover a portion of the respective spreader discs 42 and 88 equivalent to a spreader disc arc length of 60-90 degrees. The amount of arc length coverage by the hoods 48 and 84 controls the spread of agricultural material. In other words, the hoods 48 and 84 determine the tangential directions 92 and 94 of the agricultural material flow from the spreader discs. Thus, the hoods 48 and 84 may induce the first agricultural material to spread perpendicularly or approximately perpendicularly to the harvester 10, or a windrow, thus maintaining separation between the first and second agricultural materials on the field. Accordingly, a user may change hoods depending on the desired space between the first agricultural material and the windrow formed with the second agricultural material. In the event that some of the agricultural material does not exit the spreader discs 42 and 88, the hood assemblies 30 and 80 include the hoods 49 and 85, which block or reduce movement of agricultural material moving in direction 64 and induce material flow back into the hoods 48 and 84.

FIG. 4 is a perspective view of the spreader system of FIG. 2 with the hood assemblies 30 and 80 in respective second positions (e.g., spreader positions). As illustrated, the spreader system 12 enables the hood assemblies 30 and 80 to rotate around the hubs 36 and 100, and into respective spreader positions. More specifically, the actuators 43 and 96 may rotate the hoods 48 and 84 over the hoods 49 and 85, and thus from a windrow position into a spreader position. The actuators 43 and 96 enable an operator sitting in the harvester 10 to adjust how the harvester 10 discharges agricultural material. In the spreader position, the hood assemblies 30 and 80 enable the spreader discs 42 and 88 to spread the first agricultural material evenly behind the harvester 10, instead of approximately perpendicularly to the harvester 10. Moreover, with the hood assemblies 30 and 80 in the second position, the spreader system 12 evenly spreads the first and second agricultural material. As explained above, the door 34 may be transitioned into different positions to facilitate windrowing or spreading of the second agricultural material. Thus, when the door 34 is in the first position 52, the spreader assembly evenly spreads the first and second agricultural material behind the harvester 10.

FIG. 5 is a perspective view of another embodiment of a spreader system having a curtain 120 between the hubs 36 and 100. As explained above in, certain hood assemblies 30 and 80 include respective hoods 48 and 84; and walls 82 and 86. In the present embodiment, the spreader system 12 uses hoods 120 and 122 and a curtain 120, in place of the walls 82 and 86, to block airflow and agricultural material from flowing above the hoods. As illustrated, the hoods 120 and 122 are in a windrow position that directs the first agricultural material laterally outward from the spreader assembly, while enabling the second agricultural material to flow over the hoods 120 and 122. The curtain 120 functions in a similar manner as the walls 82 and 86. Specifically, it directs agricultural material into the hoods 120 and 122, instead of enabling agricultural material to flow over the hoods 120 and 122. The curtain 120 may be formed from a flexible material (e.g., plastic or rubber) or from a stiffer material (e.g., metal). When the hoods 120 and 122 rotate about the hubs 36 and 100 into a spreader position, the curtain 120 may remain in place or be removed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A Spreader system for an agricultural harvester, comprising:
    a first spreader disc having at least one paddle, wherein the first spreader disc is configured to receive a first agricultural material, a second agricultural material, or a combination thereof, and to distribute the first agricultural material, the second agricultural material, or the combination thereof, throughout a field;
    a second spreader disc having at least one paddle, wherein the second spreader disc is configured to receive the first agricultural material, the second agricultural material, or the combination thereof, and to distribute the first agricultural material, the second agricultural material, or the combination thereof, through the field;
    a first hood having an upper surface extending over a portion of the first spreader disc, wherein at least the upper surface of the first hood is configured to rotate between a first position and a second position, the first hood is configured to block upward and rearward flow of the first agricultural material, the second agricultural material, an airflow, or a combination thereof, while the first hood is in the first position, and the first hood is configured to facilitate upward and/or rearward flow of the first agricultural material, the second agricultural material, the airflow, or the combination thereof, while the first hood is in the second position; and
    a second hood having a second upper surface extending over a portion of the second spreader disc and, wherein at least the upper surface of the second hood is configured to rotate between a first position and a second position, the second hood is configured to block upward and rearward flow of the first agricultural material, the second agricultural material, the airflow, or the combination thereof, while the second hood is in the first position, and the second hood is configured to facilitate upward and/or rearward flow of the first agricultural material, the second agricultural material, the airflow, or the combination thereof, while the second hood is in the second position.

2. The Spreader system of claim 1, wherein the first and seconds hoods are connected to a first hub and a second hub respectively, wherein the first and second hoods are shaped to extend from the respective hubs over an upper portion of the spreader and then down past an upper edge and side portion of the spreader such that a portion of the spreader is partially surrounded.

3. The spreader system of claim 1, wherein the first hood is coupled to a first hub and the second hood is coupled to a second hub and the upper surfaces are generally continuous surfaces that are wider near the circumferences of the spreaders than at the respective first and second hubs.

4. The spreader system of claim 1, comprising a door configured to transition between an open position and a closed position, wherein the door is configured to direct the second agricultural material over the first and second spreader discs while the door is in the open position, and the door is configured to direct the second agricultural material into the first and second spreader discs while the door is in the closed position.

5. The spreader system of claim 4, wherein the spreader system is configured to direct the second agricultural material into a row behind the harvester, and to distribute the first agricultural material laterally outward from the row of the second agricultural material, while the door is in the open position, the first hood is in the first position and the second hood is in the first position.

6. The spreader system of claim 4, wherein the spreader system is configured to mix the first and second agricultural materials, and to distribute the first and second agricultural materials throughout a field, while the door is in the closed position, the first hood is in the second position, and the second hood is in the second position.

7. The spreader system of claim 1, wherein the first hood covers less than 30 percent of an upper portion of the first spreader disc, and the second hood covers less than 30 percent of an upper portion of the second spreader disc.

8. The spreader system of claim 1, comprising a first wall positioned above and connected to the upper surface of the first hood, and a second wall positioned above and connected to the upper surface of the second hood, wherein the first and second walls are configured to block flow of the first agricultural material, the second agricultural material, or the combination thereof, over the first and second hoods.

9. The spreader system of claim 8, wherein the first wall extends upwardly from the first hood, the second wall extends upwardly from the second hood, and the first and second walls are configured to block flow of the first agricultural material, the second agricultural material, or the combination thereof, over the first and second hood while the first hood is in the first position and the second hood is in the first position.

10. The spreader system of claim 1, comprising a flexible wall between the first and second hoods.

11. The spreader system of claim 10, wherein the flexible wall is configured to direct flow of the first agricultural material, the second agricultural material, or the combination thereof, toward the first and second spreader discs.

12. The spreader system of claim 1, comprising a chute configured to direct the first agricultural material toward the first and second spreader discs.

13. The spreader system of claim 1, wherein the first and second hoods form a chute while the first and second hoods are in the first position, and the chute is configured to direct the second agricultural material into a row behind the harvester.

14. A spreader system for an agricultural harvester, comprising:
a hood assembly comprising a rotatable first and second hoods, and wherein the first and second hoods have respective first and second upper surfaces that cover at least upper portions of respective first and second discs and are configured to rotate between a first position and a second position, in the first position the first and second hoods block upward and rearward flow of a first agricultural material, a second agricultural material, an airflow, or a combination thereof, in the second position the first and second hoods are positioned such that the first and second upper surfaces have different coverage over the respective first and second discs such that first and second hoods in the second position are configured to facilitate upward and/or rearward flow of the first agricultural material, the second agricultural material, the airflow, or the combination thereof.

15. The hood assembly of claim 14, further comprising a rotatable first wall and a rotatable second wall extend upward from the upper surface of the respective first and second hoods, and wherein the first and second rotatable walls are configured to rotate around the first and second discs from a first position to a second position.

16. The hood assembly of claim 14, wherein the first and second hoods are generally conically shaped.

17. The hood assembly of claim 14, further comprising a flexible wall configured to direct the first agricultural material, the second agricultural material, or the combination thereof into the first and second hoods.

18. A method for operating a spreader assembly of an agricultural implement, comprising:
rotating first and second hoods into a first position to extend over portions of first and second spreader discs with paddles such that the first and seconds hoods block at least a portion of upward and rearward airflow from the discs;
spinning the first and second spreader disc with paddles;
flowing a first agricultural material into the first and second discs and spreading the first agricultural material; and
flowing a second agricultural material over the first and second hoods into a row behind the agricultural implement.

19. The method of claim 18, further comprising: rotating the first and second hoods into a second position that allows rearward airflow.

20. The method of claim 19, further comprising: rotating the first and second spreader discs with paddles and flowing the first and second agricultural materials into the spreader discs.

* * * * *